J. PEARSON.
Water-Filters.

No. 142,722.

2 Sheets--Sheet 2.

Patented September 9, 1873.

Witnesses
E. W. Bates.
Phil. C. Masi.

Inventor
James Pearson
Chipman Hosmer & Co.
attys

UNITED STATES PATENT OFFICE.

JAMES PEARSON, OF SACRAMENTO, CALIFORNIA.

IMPROVEMENT IN WATER-FILTERS.

Specification forming part of Letters Patent No. 142,722, dated September 9, 1873; application filed May 17, 1873.

*To all whom it may concern:*

Be it known that I, JAMES PEARSON, of Sacramento, in the county of Sacramento and State of California, have invented a new and valuable Improvement in Water-Filters; and I do hereby declare that the following is a full, clear, and exact description of the construction and operation of the same, reference being had to the annexed drawings, making a part of this specification, and to the letters and figures of reference marked thereon.

Figure 1:
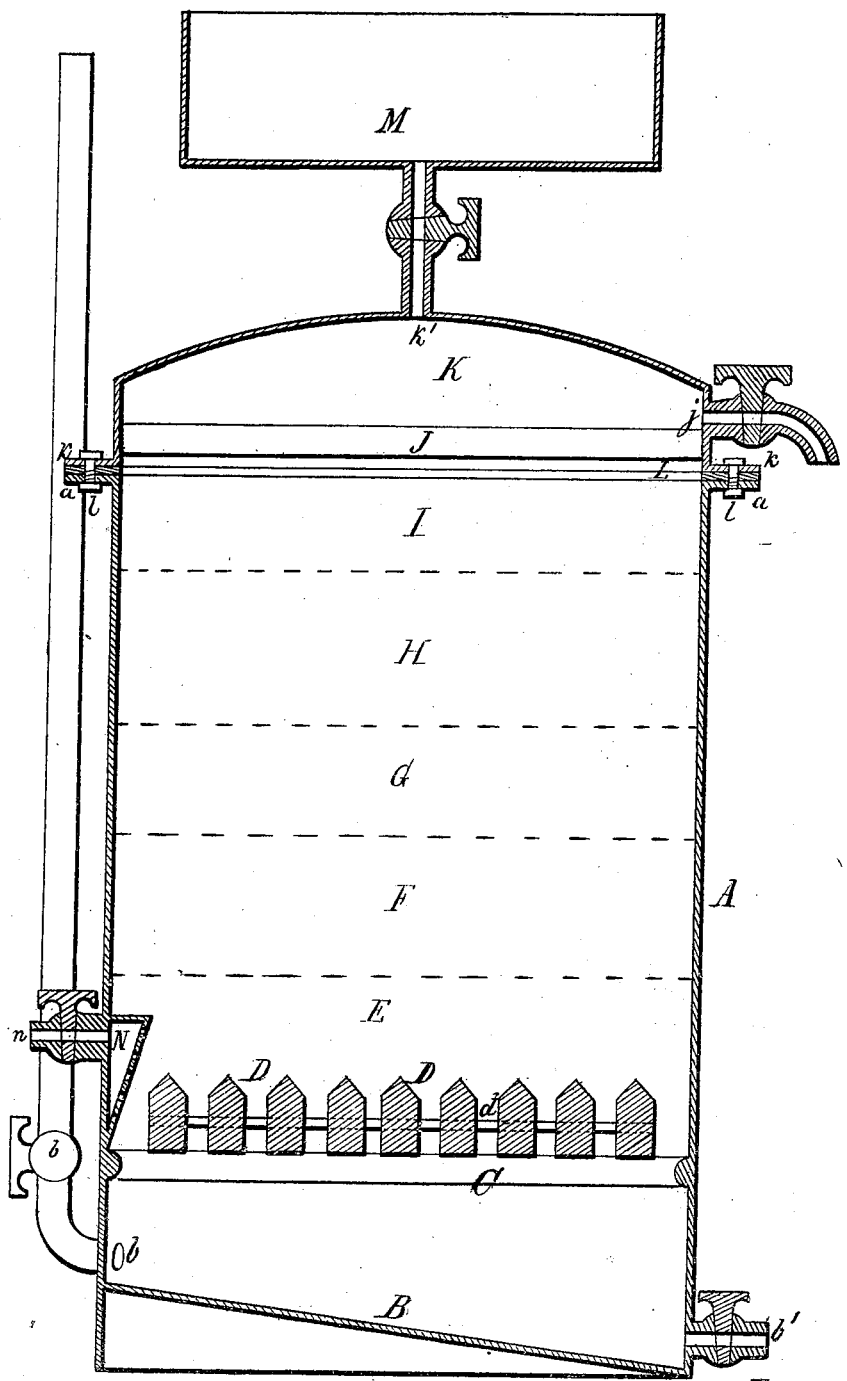
Figure 2:
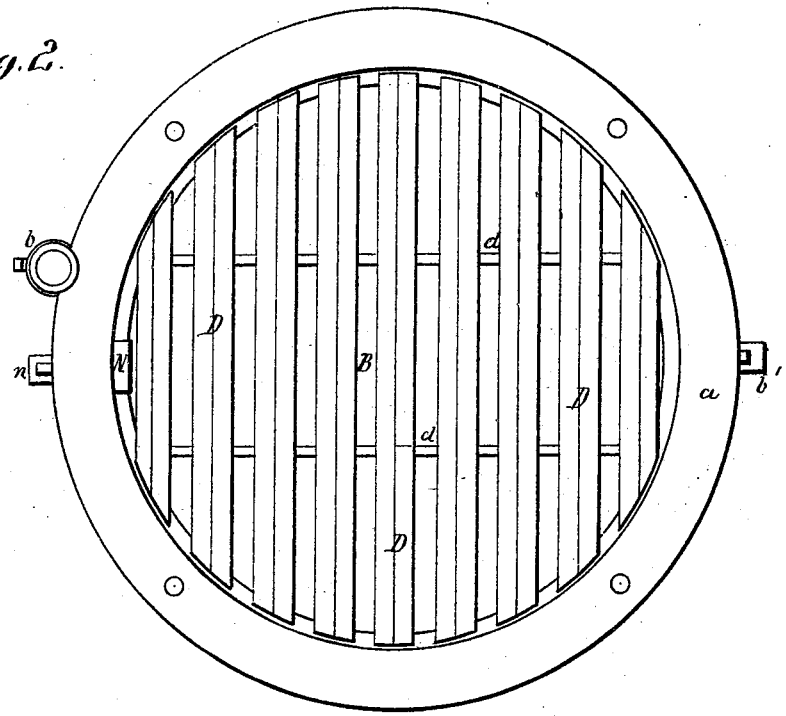
Figure 3:
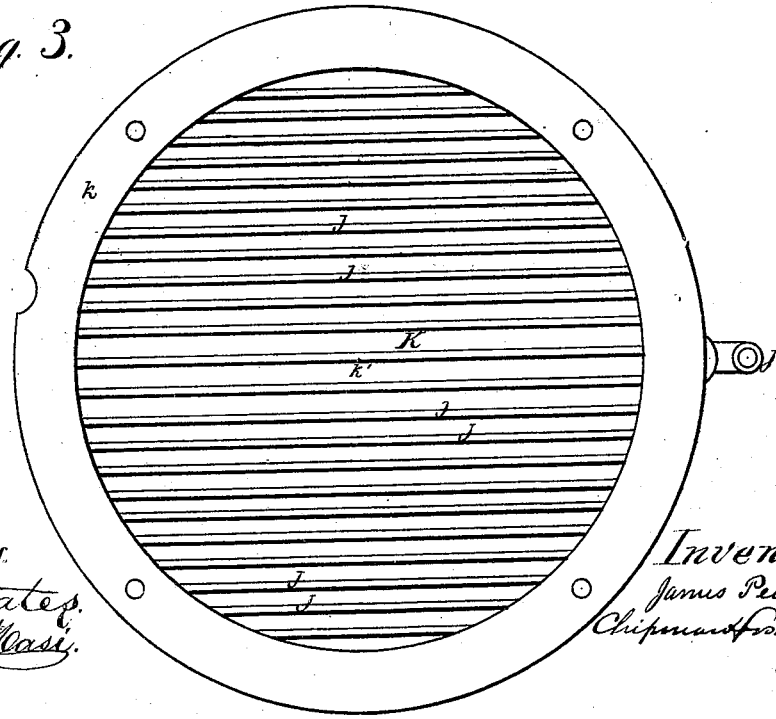

Figure 1 of the drawings is a representation of my improved water-filter by a vertical section. Fig. 2 is a top view of the main vessel. Fig. 3 is a bottom view of the cap.

My invention relates to water-filters; and it consists in the novel construction and arrangement of a filtering-chamber, a bottom chamber for cleaning purposes, and a reservoir with means to draw off the purified water above the filtering-chamber; also, a tub or reservoir for the collection of purified water in large quantities, and for the purpose of letting such collected water pass downward through the filtering material to clean it of impurities which settle in the bottom chamber, and are drawn from thence by a separate outlet. The apparatus is otherwise provided with means of drawing the air from the filter, shutting the water off the bottom chamber, and off the top reservoir. The object of my invention is to make a water-filter which may be regulated and cleaned without taking it apart.

In the drawings, A represents a vessel with an inclined bottom, B, at the lowest part of which there is a discharge-cock, $b'$, and at some other convenient place a supply-cock, $b$, which, with the aid of water-pipes, conducts the feed-water to the filter. The vessel A is provided, at some distance from the bottom B, with an inner rim, C, on which a grating is placed, which consists of bars D, with sloping tops, and connecting cross-rods $d$ passing through the said bars. On the top of the said grating is placed a layer of coarse gravel, E. On the top of this I place a layer of charcoal, F. This I cover with a layer of sand, G. The next layer H on top of the sand consists again of charcoal, and this is weighed down by a layer, I, of coarse gravel. This described charge or filling comes even with the top of the vessel A, and is bodily kept down on the grates D by a system of close grate-bars, J, or a perforated cover, which forms the bottom of the inner reservoir K. Said reservoir is fastened to the vessel A by means of the flanges $a$ and $k$, the packing L, and the bolts $l$. It is also provided with a draw-off cock, $j$, at the side, and another one, $k'$, at the top. A pipe connected with the cock $k$ conducts the water to an open reservoir, M, above the reservoir K, which is very convenient for kitchen purposes. To remove air from the vessel A a screened air-collection chamber, N, is attached to the inner surface of the vessel A above the grate-bars D, which may be emptied of its contents by aid of a stop-cock, $n$.

When the filter is ready for operation the cocks $b'$, $n$, and $j$ are closed, and the cocks $b$ and $k'$ are opened. Water is supplied from a higher level than the top of the reservoir M by any ordinary water-conduit to and through the cock $b$ into the bottom chamber B, and as it rises it forces the air up into the spaces between the gravels E, which are immediately freed of it by the opening of the cock $n$. The water rises by penetrating the layer of gravel D, and the layer of charcoal F, and the layer of sand G, which, by the close proximity of its constituent parts, retards the movement of the water, and makes it more fit for straining off the finer impurities, of which the former layers could not deprive it. The second layer of charcoal H removes the least muddy taste from the water, and the last layer of gravel I serves mainly to keep the layer of charcoal H from rising, gravel or quartz being the most suitable of cheap materials, which cannot be impregnated with flavors. The coarser parts of impurities mostly glide over the smooth surfaces of the gravel-stones in the first layer, and over the sloped tops of the grate-bars D, and settle on the inclined bottom B of the bottom chamber.

When the filter becomes choked by impurities it may be cleaned, without removing the filtering material, by closing the cocks $b$, $j$, and $n$, thereby shutting off the supply-water, and by opening the cocks $k'$ and $b'$, thereby causing the water in the reservoir M to retrace its course downward through the filtering-layers I H G F E, and thereby to carry the there entrapped impurities along to the inclined bottom B, and finally to wash the whole collection of sediments through the cock $b'$ into the sewer-pipe.

The bars J prevent the lifting of the filtering material by accidental extra-heavy pressure upon the lower parts.

What I claim as new, and desire to secure by Letters Patent, is—

The filter consisting of the vessel A, having the inclined bottom B, the grating D, the cocks $b$ and $b'$, the perforated air-chamber N, and air-cock $n$, the alternate layers E F G H I of gravel, charcoal, and sand, the cap K, the pressure-bars J, the cocks $j$ and $k'$, and the reservoir M, arranged substantially as specified.

In testimony that I claim the above I have hereunto subscribed my name in the presence of two witnesses.

JAMES PEARSON.

Witnesses:
S. R. CALDWELL,
THOS. J. McKIM.